(12) United States Patent
Thomasset (10) Patent No.: US 7,968,162 B2
(45) Date of Patent: *Jun. 28, 2011

(54) MULTILAYER DOSE

(75) Inventor: Jacques Thomasset, Vouvry (CH)

(73) Assignee: Aisapack Holding S.A., Vouvry (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/591,127

(22) PCT Filed: Feb. 26, 2005

(86) PCT No.: PCT/IB2005/050708
§ 371 (c)(1),
(2), (4) Date: Aug. 30, 2006

(87) PCT Pub. No.: WO2005/084904
PCT Pub. Date: Sep. 15, 2005

(65) Prior Publication Data
US 2007/0190286 A1    Aug. 16, 2007

(30) Foreign Application Priority Data

Mar. 1, 2004  (CH) .................... 0336/04
Oct. 4, 2004  (CH) .................... 1619/04
Dec. 8, 2004  (CH) .................... 2033/04
Dec. 8, 2004  (CH) .................... 2034/04

(51) Int. Cl.
*B32B 1/00*     (2006.01)
*B32B 1/08*     (2006.01)
*B29D 22/00*   (2006.01)

(52) U.S. Cl. .... 428/35.7; 428/36.9; 264/241; 425/131.1

(58) Field of Classification Search ............... 428/35.7, 428/131, 480, 36.6, 517; 264/167, 173.16, 264/521; 427/593
See application file for complete search history.

(56) References Cited

U.S. PATENT DOCUMENTS

| | | | |
|---|---|---|---|
| 3,901,638 A | 8/1975 | Yoshikawa et al. | |
| 3,969,563 A | 7/1976 | Hollis, Sr. | |
| 4,154,893 A | 5/1979 | Goldman | |
| 4,390,487 A | 6/1983 | O'Mara | |

(Continued)

FOREIGN PATENT DOCUMENTS

JP     51-100163     9/1976

(Continued)

OTHER PUBLICATIONS

Patent Abstracts of Japan vol. 014, No. 305, Jun. 29, 1990 & JP 02 098415, Apr. 10, 1990.

(Continued)

*Primary Examiner* — Rena L Dye
*Assistant Examiner* — Ellen S Wood
(74) *Attorney, Agent, or Firm* — Nixon & Vanderhye P.C.

(57) ABSTRACT

A dose of multilayer synthetic resin for the realization of multilayer objects by compression molding, said dose having an axis of symmetry and comprising a first synthetic resin (2) and at least one fine functional layer (3) of synthetic resin forming the outer shell of a body of revolution defined about said axis of symmetry, said body of revolution comprising two ends disposed in a direction parallel to the axis of symmetry, said dose being characterized in that the functional layer (3) is imprisoned in said first synthetic resin (2), totally or in such a way that no more than a single one of said ends is not imprisoned in said first resin (2).

11 Claims, 8 Drawing Sheets

U.S. PATENT DOCUMENTS

| | | | |
|---|---|---|---|
| 4,876,052 | A | 10/1989 | Yamada et al. |
| 4,883,630 | A | 11/1989 | Langecker |
| 4,921,647 | A | 5/1990 | Stewart |
| 4,940,557 | A | 7/1990 | Kimura |
| 5,296,278 | A | 3/1994 | Nishimura et al. |
| 5,403,529 | A * | 4/1995 | Kawaguchi .................. 264/167 |
| 5,975,871 | A | 11/1999 | Kudert et al. |
| 6,332,767 | B1 | 12/2001 | Kudert et al. |
| 6,467,643 | B1 | 10/2002 | Sadr |
| 6,613,408 | B1 | 9/2003 | Short |
| 6,808,673 | B2 | 10/2004 | Van Schaftingen |
| 2002/0182351 | A1* | 12/2002 | Akiyama et al. ............. 428/35.7 |
| 2003/0080461 | A1 | 5/2003 | Kirjavainen |

FOREIGN PATENT DOCUMENTS

| | | |
|---|---|---|
| JP | 61-259942 | 11/1986 |
| JP | 62-184817 | 8/1987 |
| JP | 2-098415 | 4/1990 |
| JP | 02098415 | 4/1990 |
| JP | 2-134222 | 5/1990 |
| JP | 6-320597 | 11/1994 |
| JP | 11-268782 | 10/1999 |
| JP | 2000-326393 | 11/2000 |
| JP | 2001-163321 | 6/2001 |
| JP | 2003-71910 | 3/2003 |

OTHER PUBLICATIONS

English Translation of International Preliminary Report on Patentability.
Office Action mailed Nov. 24, 2009 in U.S. Appl. No. 10/590,201.
Office Action mailed Feb. 5, 2010 in U.S. Appl. No. 10/591,117.
Office Action mailed Feb. 4, 2010 in U.S. Appl. No. 10/591,126.
Office Action mailed Dec. 3, 2009 in U.S. Appl. No. 10/591,127.
Office Action mailed May 18, 2010 in U.S. Appl. No. 10/590,201.
Notice of Allowance Sep. 23, 2010 in U.S. Appl. No. 10/590,201.
Office Action mailed Oct. 4, 2010 in U.S. Appl. No. 10/591,117.
Advisory Action mailed Aug. 19, 2010 in U.S. Appl. No. 10/591,126.
Office Action mailed Sep. 1, 2010 in U.S. Appl. No. 10/591,127.
Patent Abstracts of Japan vol. 014, No. 305, Jun. 29, 1990 & JP 02 098415, Apr. 10, 1990.
International Search Report.
Office Action mailed Oct. 31, 2008 in U.S. Appl. No. 10/590,201.
Office Action mailed Jun. 8, 2009 in U.S. Appl. No. 10/590,201.
Advisory Action mailed Oct. 28, 2009 in U.S. Appl. No. 10/590,201.
Office Action mailed Jun. 11, 2008 in U.S. Appl. No. 10/591,117.
Office Action mailed Dec. 24, 2008 in U.S. Appl. No. 10/591,117.
Interview Summary mailed May 6, 2009 in U.S. Appl. No. 10/591,117.
Office Action mailed Aug. 18, 2009 in U.S. Appl. No. 10/591,117.
Interview Summary mailed Oct. 28, 2009 in U.S. Appl. No. 10/591,117.
Office Action mailed Jun. 12, 2008 in U.S. Appl. No. 10/591,116.
Notice of Allowance mailed Jan. 28, 2009 in U.S. Appl. No. 10/591,116.
Office Action mailed Jun. 12, 2008 in U.S. Appl. No. 10/591,126.
Office Action mailed Dec. 24, 2008 in U.S. Appl. No. 10/591,126.
Advisory Action mailed Apr. 6, 2009 in U.S. Appl. No. 10/591,126.
Office Action mailed Jul. 2, 2009 in U.S. Appl. No. 10/591,126.
Interview Summary mailed Oct. 28, 2009 in U.S. Appl. No. 10/591,126.
Office Action mailed Jun. 11, 2008 in U.S. Appl. No. 10/591,127.
Office Action mailed Dec. 17, 2008 in U.S. Appl. No. 10/591,127.
Advisory Action mailed Jul. 6, 2009 in U.S. Appl. No. 10/591,127.

* cited by examiner

MULTILAYER DOSE

This application is the US national phase of international application PCT/IB2005/050708 filed 26 Feb. 2006 which designated the U.S. and claims benefit of CH 00336/04; CH 01619/04; CH 02034/04; CH 02033/04, dated 1 Mar. 2004; 4 Oct. 2004; 8 Dec. 2004; 8 Dec. 2004, respectively, the entire content of which is hereby incorporated by reference.

FIELD OF THE INVENTION

The present invention relates to a method for realizing multilayer objects by compression molding of a multilayer dose.

PRIOR ART

Figure 1:
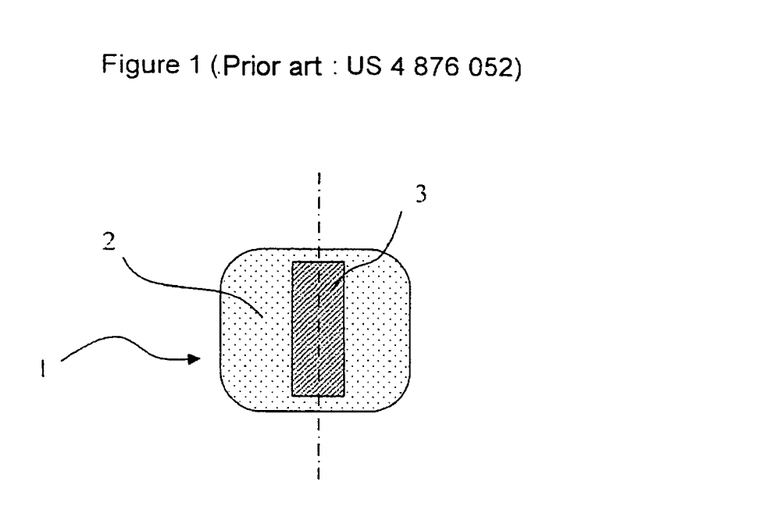
FIG. 1 shows a double-layer dose realized according to U.S. Pat. No. 4,876,052.

U.S. Pat. No. 4,876,052 describes a cylindrical multilayer dose (FIG. 1), characterized in that a functional resin 3 is fully imprisoned inside a synthetic resin 2. The functional resin and the outer resin are different in nature. For example, the functional resin has good gas-barrier properties, whereas the resin forming the outer layer is chosen for its mechanical and hygienic properties. These multilayer doses allow multilayer objects to be obtained by compression molding of said dose. However, the objects obtained according to the method described in U.S. Pat. No. 4,876,052 require a large proportion of functional resin in the object, thereby engendering two major drawbacks: the first being a prohibitive cost and the second a lowered resistance to mechanical stresses. The lack of adhesion between the functional resin and the outer resin reduces the solidity of the object and creates a risk of decohesion of the outer layer. Another drawback of U.S. Pat. No. 4,876,052 lies in the fact that the respective quantity of the resins 2 and 3 is only poorly adjustable, these quantities being fixed by the geometry of the object and by the flows during the compression of the dose.

Figure 2:
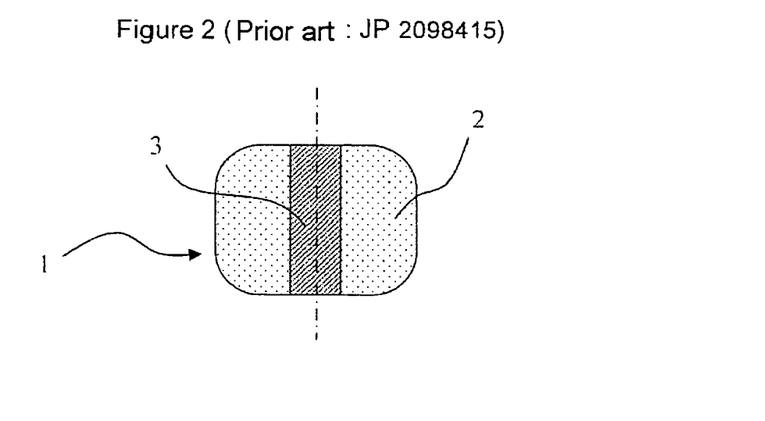
FIG. 2 shows a double-layer dose used in patent JP 2098415.

Japanese patent JP 2098415 proposes the realization of a multilayer object by compression molding starting from a cylindrical dose (FIG. 2), characterized in that the synthetic resin 2 covers only the side faces of the functional resin 3. The compression molding of this dose along its axis of symmetry produces an object having a multilayer structure characterized in that the synthetic resin 2 partially imprisons the functional resin 3. However, the multilayer objects realized from two resins according to patent JP 2098415 have a number of major drawbacks: the first being that of having the functional resin 3 exposed on a central surface area of the object over at least 10% of the total surface area of the object, and the second being that of requiring a quantity of functional resin 3 in the object amounting to at least 30% of the total quantity of resin. This produces, on the one hand, objects having a prohibitive cost and, on the other hand, objects having heavily modified mechanical properties, mainly in the center of the object. Another drawback of JP 2098415 lies in the fact that the respective quantity of the resins 2 and 3 is only poorly adjustable, these quantities being fixed by the geometry of the object and by the flows during the compression of the dose. Patent JP 2098415 has a final major drawback, which is the fact that both resins are located at least partially on the surface of the object, which poses hygiene problems according to the resins used.

Figure 3:
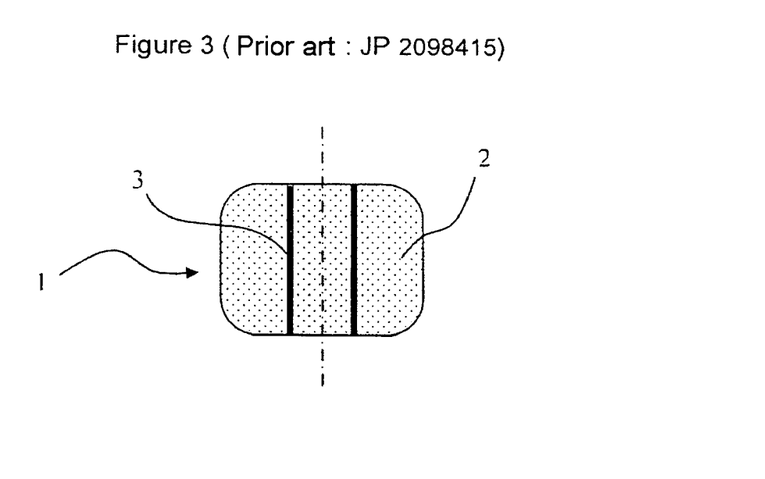
FIG. 3 illustrates a dose containing 3 layers, described in patent JP 2098415.

In patent JP 2098415, it is proposed to use a cylindrical dose containing 3 layers (FIG. 3) in order partially to eliminate the aforesaid drawbacks. This dose is constituted by a first resin forming the central part of the dose, by a functional resin 3 covering only the side faces of the first resin, and by a third resin 2 covering only the side faces of the functional resin. The crushing of this composite dose along its axis of symmetry produces a multilayer object. The use of a triple-layer dose has the advantage of reducing the quantity of functional resin 3 used and produces objects having slightly modified mechanical properties in relation to the same object containing a single resin 2. This method allows an adhesive layer to be added between the resins of different nature, thereby improving the cohesion and solidity of the object. However, the functional resin 3 does not cover the central part of the multilayer object, which produces objects without barrier property close to the axis of symmetry over a surface area of at least 10% of the surface area of the object. This central region of the object not covered by the barrier resin layer 3 weakens the barrier performance of the object and renders this solution less effective. Patent JP 2098415 has a final major drawback, which is the fact that the three resins are located at least partially on the surface of the object, which poses hygiene problems according to the resins used.

SUBJECT OF THE INVENTION

The present invention allows multilayer objects to be realized by compression molding, by eliminating the aforesaid problems.

SUMMARY OF THE INVENTION

The invention consists of a multilayer dose having an axis of symmetry for the realization of multilayer objects by compression molding, said dose being constituted by a first synthetic resin and by at least one fine functional layer forming the surface of a body of revolution, said functional layer being imprisoned in the first resin, the multilayer dose being characterized in that no more than one end of said layer is not imprisoned in the first resin.

The invention is particularly useful for realizing multilayer objects intended for use in the field of packaging and, more particularly, in the food sector, where hygiene standards are high.

The invention describes multilayer doses which allow packagings or packaging components to be obtained which have a functional layer totally absent from that surface of the wall of the packaging which is in contact with the packaged product.

According to a first embodiment of the invention, the fine functional layer 3 is totally imprisoned in the resin 2 forming the dose. The multilayer object obtained is characterized in that the functional layer 3 is totally imprisoned in the wall of said object, such that only the resin 2 is present on the surface of said object.

According to a second embodiment of the invention, the fine functional layer 3 is totally imprisoned apart from one of its ends, said end being visible on the surface of said dose. The multilayer object obtained, containing an inner face and an outer face, is characterized in that the functional layer 3 is at least absent from one of the faces of the object.

The method for obtaining multilayer doses is described in the present invention.

DETAILED DESCRIPTION OF THE INVENTION

A better understanding of the invention will be gained below from a detailed description of the examples illustrated by the following figures.

BRIEF DESCRIPTION OF THE FIGURES

FIGS. 1 to 3 describe the multilayer doses described in the prior art for realizing multilayer objects by compression molding.

DETAILED DESCRIPTION OF THE FIGURES

The invention describes multilayer doses which are advantageous for realizing multilayer objects and, in particular, packagings or packaging components. For reasons of hygiene, it is often desirable for the packaged product not to be in direct contact with the functional resins. The functional resins can be barrier resins, which are used to provide properties offering impermeability to gases or to aromas, or adhesive resins, which can be used to combine a plurality of resins.

The invention describes multilayer doses which allow packagings or packaging components to be obtained which can be used in the food sector, the functional layer 3 being totally absent from the surface of the packaging which is in contact with the packaged product.

According to a first embodiment of the invention, it was found that a dose having a fine functional layer 3 completely imprisoned in a first resin 2 was particularly advantageous for realizing multilayer objects having good hygienic properties. The multilayer object obtained is characterized in that the functional layer 3 is totally imprisoned in the wall of said object, such that only the resin 2 is present on the surface of said object.

According to a second embodiment of the invention, the fine functional layer 3 is totally imprisoned, apart from at the level of one of its ends, said end being visible on the surface of said dose. The multilayer object obtained by the compression of the dose in a mold contains an inner face and an outer face and is characterized in that the functional layer 3 is at least absent from one of the faces of the object.

A great diversity of multilayer doses can be realized according to the invention. Said doses can be of the cylindrical or tubular type, or of more complex geometry.

The invention also relates to the methods for realizing said doses.

The invention likewise describes the multilayer objects obtained by the compression molding of said doses.

Figure 4:
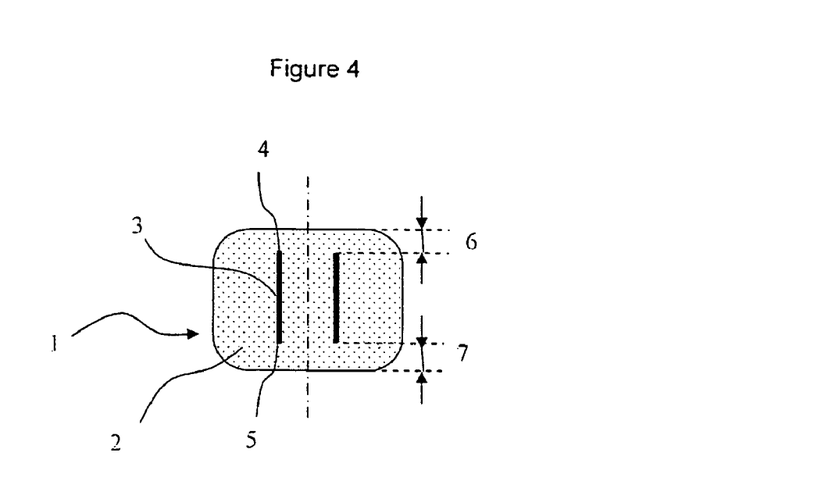
FIG. 4 shows a first example of a multilayer dose corresponding to the first embodiment of the invention. This cylindrical dose comprises a fine functional layer 3 of resin, totally imprisoned inside the resin 2 forming the dose.

FIG. 4 illustrates a multilayer dose corresponding to the first embodiment of the invention. This dose 1 is constituted by a fine layer of functional resin 3 imprisoned in a resin 2. The fine layer of functional resin 3 contains two free ends 4 and 5 situated inside the resin 2, said ends being separated from the surface of said dose by a distance 6, 7 sufficient for these ends likewise to be absent from the surface of the molded object. The functional layer 3 is disposed in the dose such that said layer 3 is distributed throughout the molded object without said layer 3 being visible on the surface of said object. FIG. 4 illustrates a dose in which the functional layer describes the shell of a cylinder centered on the axis of symmetry of the dose. This dose has the advantage of being easily produced.

The functional layer 3 ideally represents a small part of the volume of the dose or object, the volume of the layer 3 being generally less than 20% of the total volume, and preferably less 10%.

Figure 5:
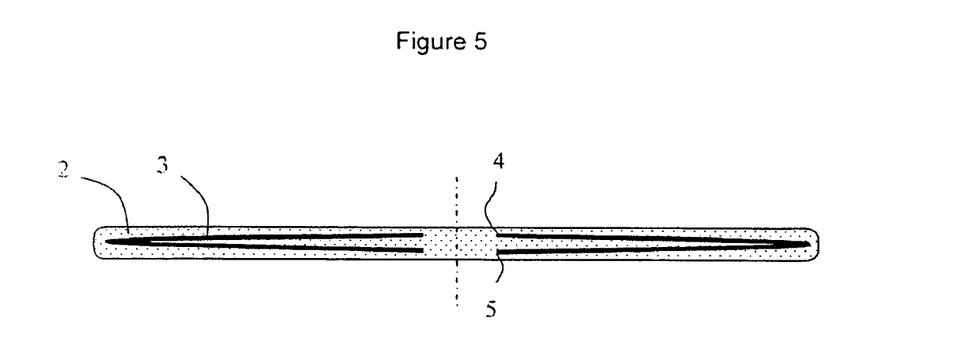
FIG. 5 illustrates a multilayer object realized from the compression in a mold of the dose illustrated in FIG. 4. The functional layer 3 forms a fold and is completely absent from the surface of the object.

FIG. 5 shows the multilayer object obtained from the compression in a mold of the dose represented in FIG. 4. This object contains the fine functional layer 3 totally imprisoned in the wall of said object, said layer 3 forming a fold close to the periphery of said object, said fold and said ends 4 and 5 being totally imprisoned in said object.

The relationship between the position of the fine layer 3 in the dose and in the object is defined by the multilayer flow during the compression of said dose in the mold.

It has been found that the position of the fold of the functional layer 3 in the object depends on the radial position of the layer 3 in said dose; when the layer 3 approaches the periphery of the dose, the fold of the layer 3 approaches the periphery of the object. If the layer 3 is too close to the periphery of the dose, a part of the layer 3 is found on the surface of the object. There is therefore an optimal position of the layer 3 in said dose, which leads to the spreading of the layer 3 and the formation of a fold proximate to the periphery of the object, said layer 3 remaining imprisoned in the object.

It has likewise been found that the position of the ends 4 and 5 of the functional layer 3 in the object depend little on the flows during the compression. It has also been observed that it is difficult to imprison the ends of the functional layer 3 in the object when this layer is not imprisoned in the dose. Conversely, it has been found that when the ends 4 and 5 of the functional layer 3 are absent from the surface of the dose, these are likewise absent from the surface of the object. It was likewise observed that a very small distance between the ends of the layer 3 and the surface of the dose was sufficient for these ends to be absent from the surface of the object. Distances 6 and 7 as small as 50 microns between the ends of the layer 3 and the surface of the dose are sufficient to prevent the ends of the layer 3 from being located on the surface of the object.

Figure 6:
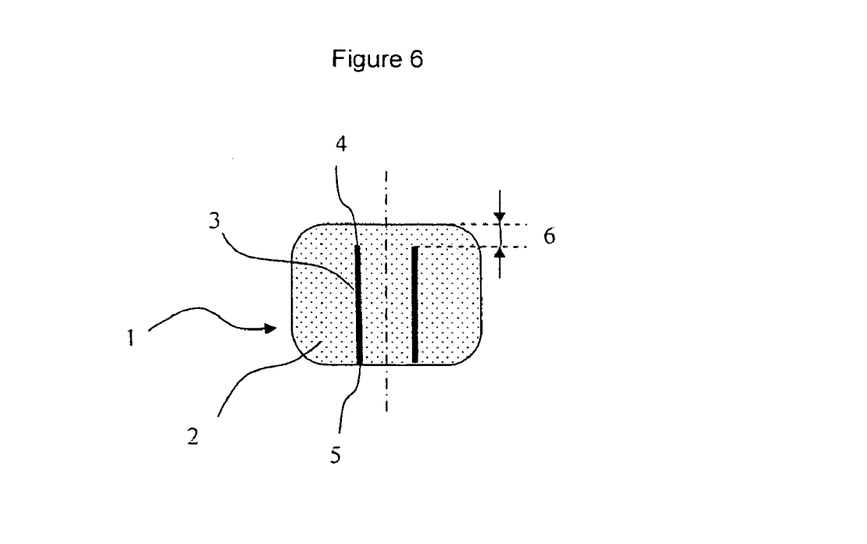
FIG. 6 illustrates a multilayer dose corresponding to the second embodiment of the invention. This cylindrical dose comprises a fine functional layer of resin 3, having one end 5 which is not imprisoned inside the resin 2 forming said dose.

FIG. 6 illustrates a multilayer dose corresponding to the second embodiment of the invention. This dose 1 is constituted by a fine layer of functional resin 3 imprisoned in a resin 2. The fine layer of functional resin 3 contains two free ends 4 and 5, the first end 4 being totally imprisoned in the resin 2 such that the end 4 is totally absent from the surface of said dose, the second end 5 being present on the surface of said dose. The first end 4 is separated from the surface of said dose by a distance 6 sufficient for this end likewise to be absent from the surface of the molded object. The functional layer 3 is disposed in the dose such that said layer 3 is distributed throughout the molded object without said layer 3 being visible on the surface of the wall of said object in places where the hygiene constraints are important.

Figure 7:
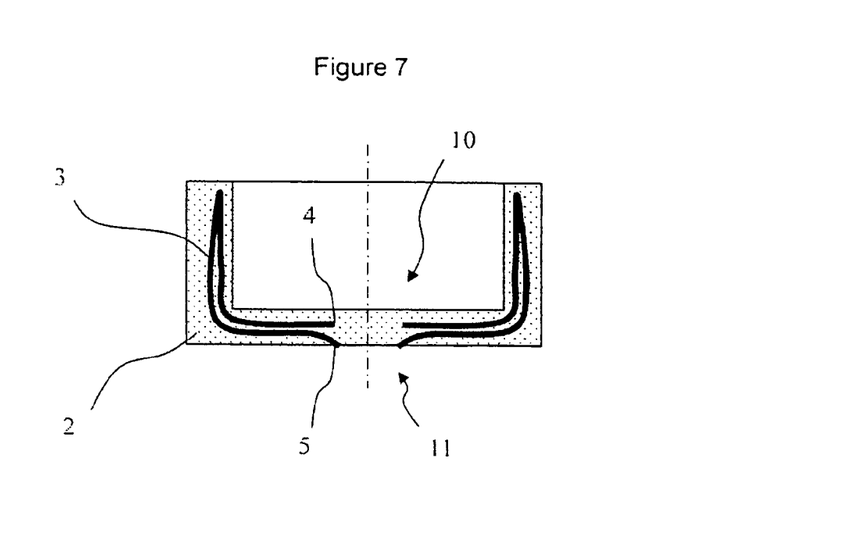
FIG. 7 illustrates a multilayer object obtained from the compression in a mold of the dose illustrated in FIG. 6. The functional resin layer 3 is imprisoned in the resin 2, apart from its end 5 which lies flush with the outer surface 11 of said object.

FIG. 7 shows a multilayer packaging obtained from the compression in a mold of the dose represented in FIG. 6. This packaging has the fine functional layer 3 totally absent from the surface 10 of the wall of said packaging which is in contact with the packaged product. The functional layer 3 forms a fold close to the periphery of said packaging, said fold and said end 4 being totally imprisoned in the wall of the packaging. The end 5 of the functional layer 3 is present at the level of the outer surface 11 of the packaging, said outer surface 11 not being in contact with the packaged product. The layer 3 is only present on a very small part of the surface of the packaging, this surface representing generally less than 1% of the total surface area, and preferably less than 0.1% of the total surface area, bearing in mind the small thickness of said layer 3.

A number of multilayer doses corresponding to the first or second embodiment of the invention are described by way of example.

Figure 8:
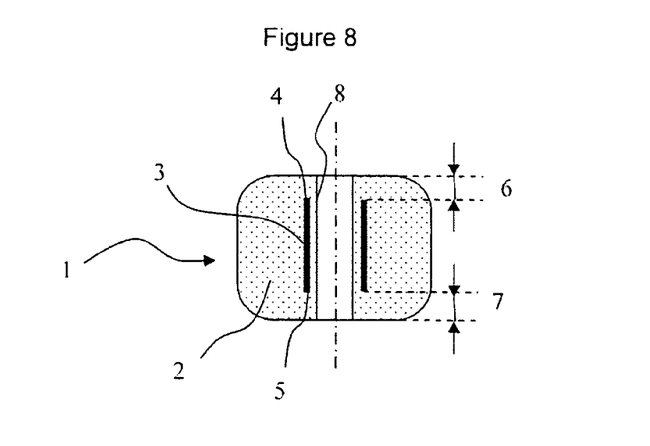
FIG. 8 illustrates another example of a multilayer dose realized according to the first embodiment of the invention. This tubular dose is formed by a fine functional layer 3 totally imprisoned inside the resin 2 forming said dose.

An example of a dose corresponding to the first embodiment of the invention is illustrated in FIG. 8. This dose comprises a fine functional layer 3 imprisoned in a resin 2 forming the dose. The functional layer is imprisoned both laterally and in terms of its ends 4 and 5, such that the functional layer 3 is totally absent from the surface of the dose. The dose contains an orifice 8 centered on the axis of symmetry.

Figure 9:
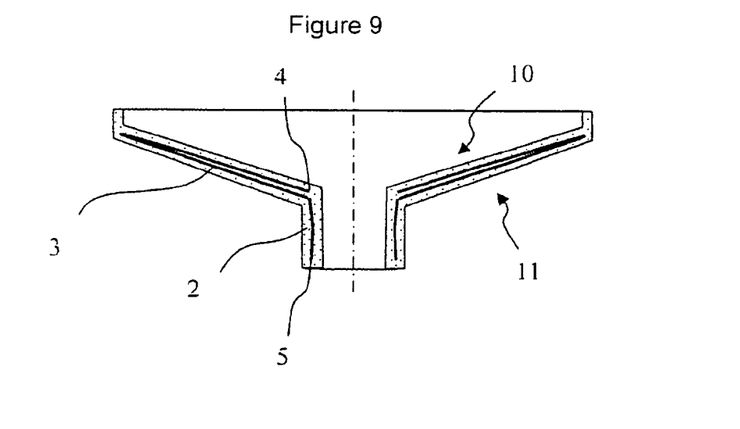
FIG. 9 shows a tube shoulder obtained by the compression in a mold of the dose presented in FIG. 8. The functional layer 3 is totally absent from the surface of said tube shoulder.

FIG. 9 shows a tube shoulder obtained by compression in a mold of the dose illustrated in FIG. 8. The fine layer 3 is found totally absent from the inner 10 and outer surface 11 of said shoulder, the layer 3 forming a fold in the periphery of the shoulder and the ends 4 and 5 of said layer 3 being proximate to the orifice 9 of said object.

Figure 10:
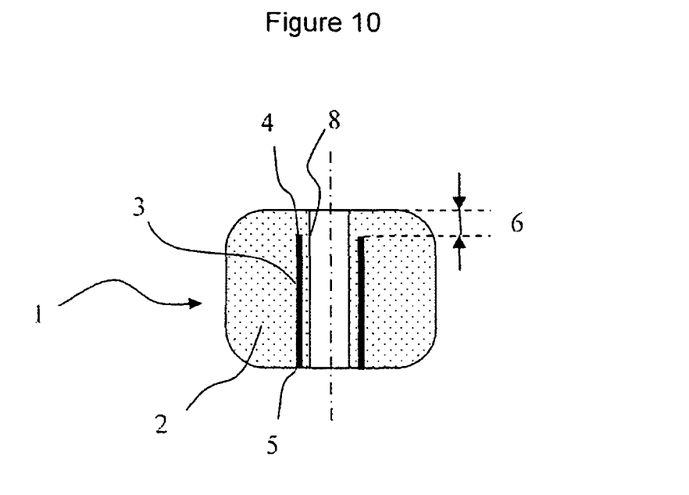
FIG. 10 illustrates another example of a multilayer dose realized according to the second embodiment of the invention. This tubular dose is formed by a fine functional layer 3 partially imprisoned inside the resin 2 forming said dose. The end 5 of the functional layer 3 is present on the surface of the dose.

FIG. 10 illustrates a dose containing an orifice and realized according to the second embodiment of the invention. This dose 1 is constituted by a fine layer of functional resin 3 imprisoned in a resin 2. The fine layer of functional resin 3 contains two free ends 4 and 5, the first end 4 being totally imprisoned in the resin 2, the second end 5 being present on the surface of said dose.

Figure 11:
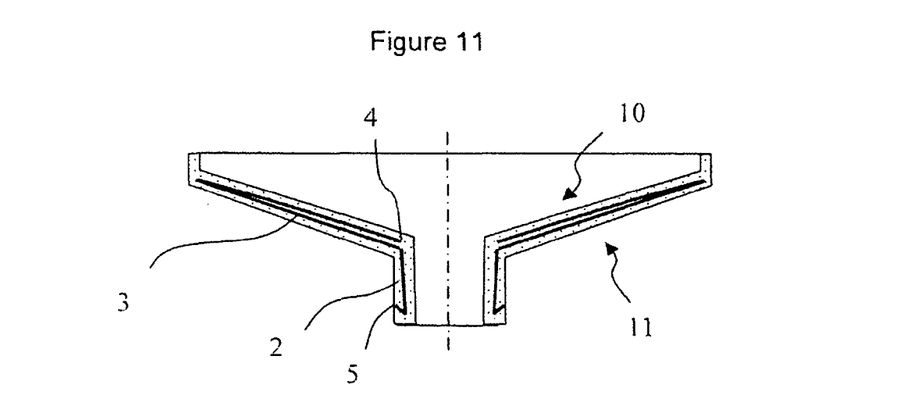
FIG. 11 shows a tube shoulder obtained by the compression in a mold of the dose presented in FIG. 10. The functional layer 3 is totally absent from the inner surface 10 of said tube shoulder, said inner face being in contact with the packaged product. The functional layer 3 is partially present on the outer surface of the tube shoulder.

FIG. 11 shows a tube shoulder obtained by compression in a mold of the dose illustrated in FIG. 10. The fine layer 3 is found totally absent from the surface 10 of the shoulder, said surface 10 being located inside the tube and being in contact with the packaged product. The layer 3 forms a fold in the periphery of the shoulder and is totally imprisoned inside the wall of the tube. The end 5 of the layer 3 is present on the outer surface 11, the surface 11 being outside the packaging.

Figure 12:
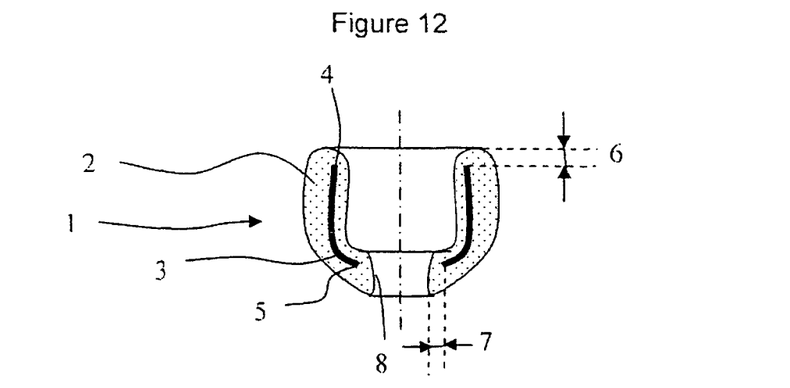
FIGS. 12, 13, 14 and 15 show other examples of a multilayer dose corresponding to the invention.

FIG. 12 shows another example of a dose which is particularly advantageous for realizing multilayer objects. The imprisonment of the ends 4 and 5 of the fine functional layer 3 inside the resin 2 allows an object to be obtained which is totally devoid of said layer 3 on the surface. These doses are particularly advantageous for realizing multilayer objects with or without orifice.

Figure 13:
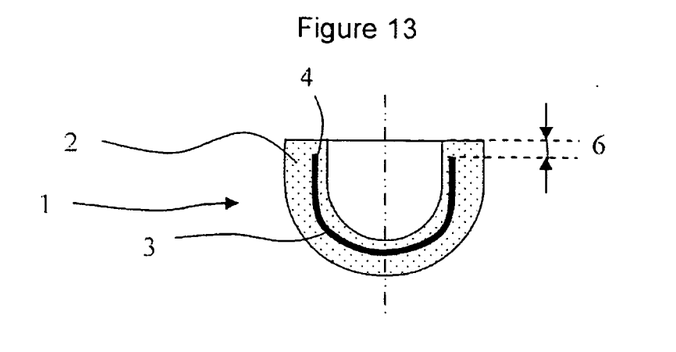

FIG. 13 illustrates a dose geometry having a cavity in its center. This multilayer dose comprises a fine functional layer 3 imprisoned in a first resin 2 forming at least 80% of said dose. The end 4 of the layer 3 is located at a distance 6 from the surface of the dose, such that, during the compression of said dose, the end 4 of said layer 3 is absent from the surface of the object.

Figure 14:
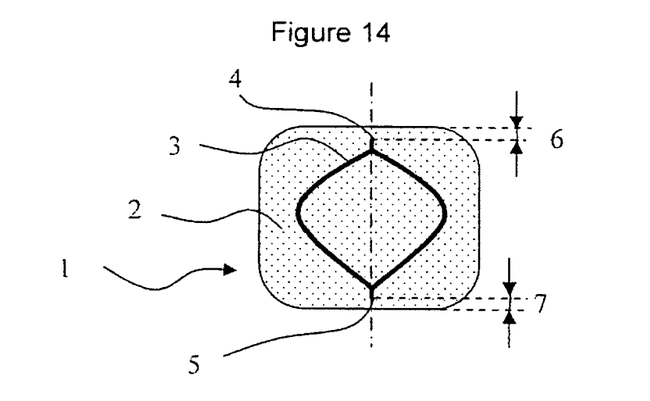

FIG. 14 shows a multilayer dose 1 comprising a fine functional layer 3 at least partially imprisoned in a first resin 2, said resin 2 representing at least 80% of the volume of the dose. The layer 3 forms the shell of a body of revolution centered on the axis of symmetry of said dose. According to the first embodiment of the invention, the ends 4 and 5 of the layer 3 are likewise imprisoned in the first resin 2, such that the layer 3 is totally imprisoned in the resin 2. According to the second embodiment of the invention, only the end 5 of the layer 3 is not imprisoned in the resin 2, such that, following compression of the dose in a mold, only the end 5 of the layer 3 is located on the surface of the molded object.

Figure 15:
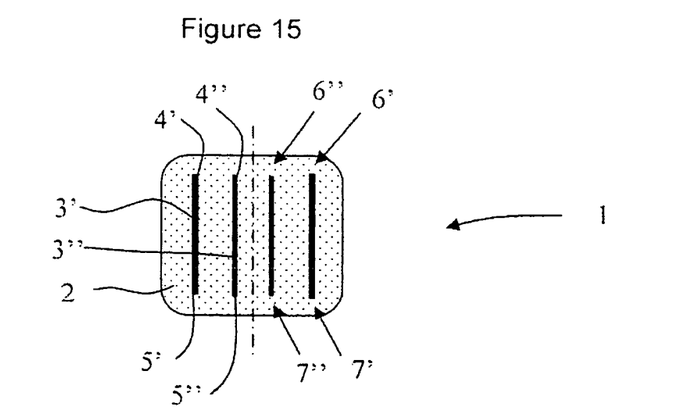

FIG. 15 illustrates another example of a dose comprising two fine functional layers 3' and 3" centered on the axis of symmetry of said dose and at least partially imprisoned in a first resin 2. According to the first embodiment of the invention, the layer 3 is totally imprisoned in the resin 2, even at the level of its ends 4', 5' and 4", 5". According to the second embodiment of the invention, only the ends 5' and 5" of the layers 3' and 3" are not imprisoned in the resin 2.

The objects represented in FIGS. 9 and 11 have been realized with a fine layer of barrier resin (EVOH) imprisoned in a polyethylene (PE) resin. These objects have great impermeability to oxygen or to aromas.

In order to simplify the account of the invention, the figures have deliberately been represented with only one functional layer 3 imprisoned in a second resin 2. It is known that the combination of only two resins does not generally allow sufficient adhesion to be obtained at the interface between the two resins. It is customary, too, to use adhesive intermediate layers, which allow resins of different nature to be combined, while guaranteeing a good level of adhesion between the layers. Thus, the insertion of an adhesive layer on either side of the barrier layer prevents possible problems of delamination or decohesion in the multilayer objects. The adhesive and barrier layers are parallel and in small quantity. The aggregate of the adhesive layers forming the functional layer 3 generally represents a quantity of resin less than 15% of the total resin volume forming the dose, and preferably a quantity less than 10%. The present invention is not therefore limited to 3-layer doses such as presented in FIGS. 4, 6, 8, 10, 12, 13 and 14, but more generally contain 5 layers or more.

The resins used within the scope of the invention correspond to the thermoplastic resins currently being used, and more particularly to those used in the packaging industry.

Among the barrier resins which may be used to form the functional layer 3 can be cited ethylene vinyl alcohol (EVOH) copolymers, polyamides such as Nylon-MXD6, acrylonitrile-methyl acrylate copolymers (BAREX), fluorinated polymers such as PVDF. In this connection may also be cited a few resins which may be used to form the structure 2 of the object: polyethylene (PE), polypropylene (PP), polystyrene (PS), polyamide (PA), polyester (PET). This list is not exhaustive. In the choice of resins, it is important to select products which have neighboring viscosities. In general, it is preferable to use resins which, at working temperature, have a viscosity ratio less than 10, and preferably a viscosity ratio less than 3 will be chosen.

The compression molding method consists in feeding a multilayer dose of synthetic resins in the molten state into the cavity of a mold, in forming the object by compression molding of said dose in the cavity of said mold, in cooling the object and then removing it from the mold.

The invention allows the realization of objects having a very fine functional layer, which functional layer can represent less than 5% of the volume of the object.

The method for realizing multilayer objects which is set out below is particularly advantageous for realizing objects such as plugs, lids, preforms, or, indeed, tube shoulders. This method can likewise advantageously be used to realize preforms in the form of a slab, these slabs then being used in thermoforming or blow thermoforming to form multilayer objects.

The doses previously presented can be realized according to a number of methods.

A first method consists in coextruding the resins so as to form a multilayer structure, and at least the functional layer 3 being extruded intermittently.

Figure 16:
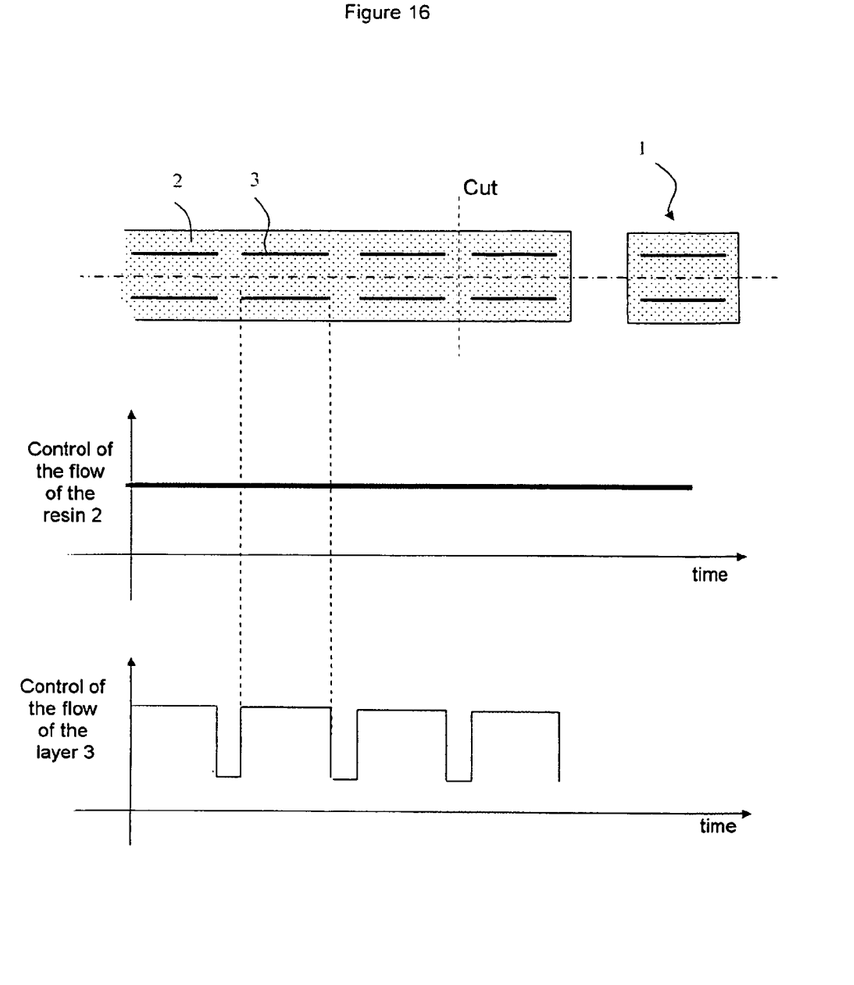
FIG. 16 shows a first method for realizing doses according to the first embodiment of the invention.

An example of this method is illustrated in FIG. 16. A multilayer rod is coextruded continuously, the flow of the functional layer 3 being periodical and intermittent, the periodicity of the layer 3 and of the cutting of said rod being identical. This method is particularly advantageous for the high-speed realization of multilayer doses. This method is advantageously used for the realization of doses having the functional layer 3 totally imprisoned in the resin 2.

Figure 17:
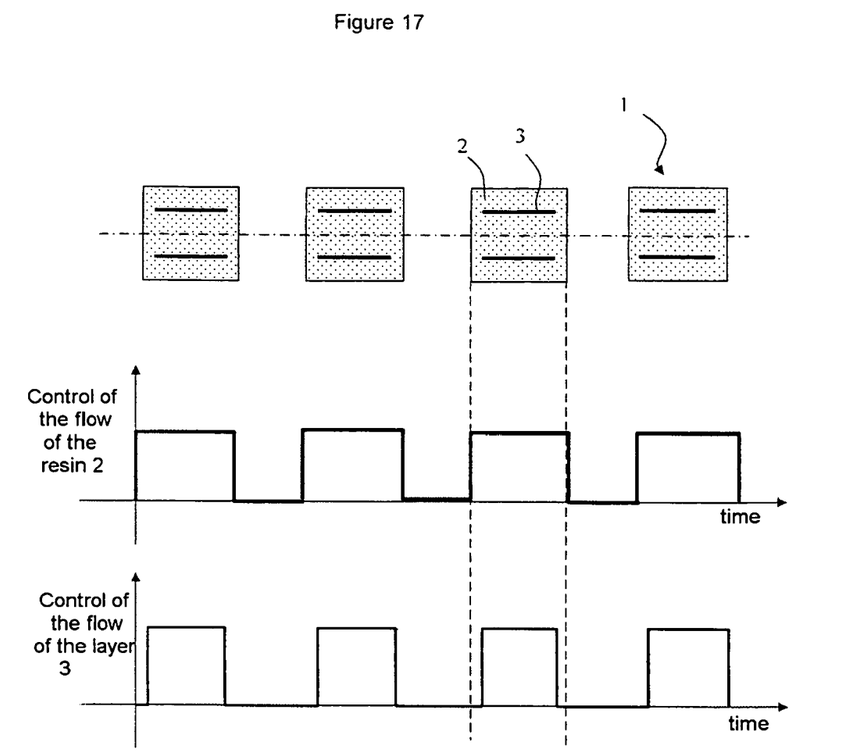
FIG. 17 illustrates another method for realizing doses according to the first embodiment of the invention.

A second example of the realization of multilayer doses according to this first method is illustrated in FIG. 17. A multilayer rod is coextruded discontinuously, such that the overall flow of coextruded resin fluctuates between a maximum value and a zero value, the quantity of material dosed during a period corresponding to one dose. The functional layer 3 is fed for a shorter time than the resin 2, such that the ends of the layer 3 are imprisoned in the resin 2.

A second method for producing a multilayer dose according to the invention consists in imprisoning at least one end of the layer 3 in the resin 2, said imprisonment being realized outside the extrusion die.

Figure 18:
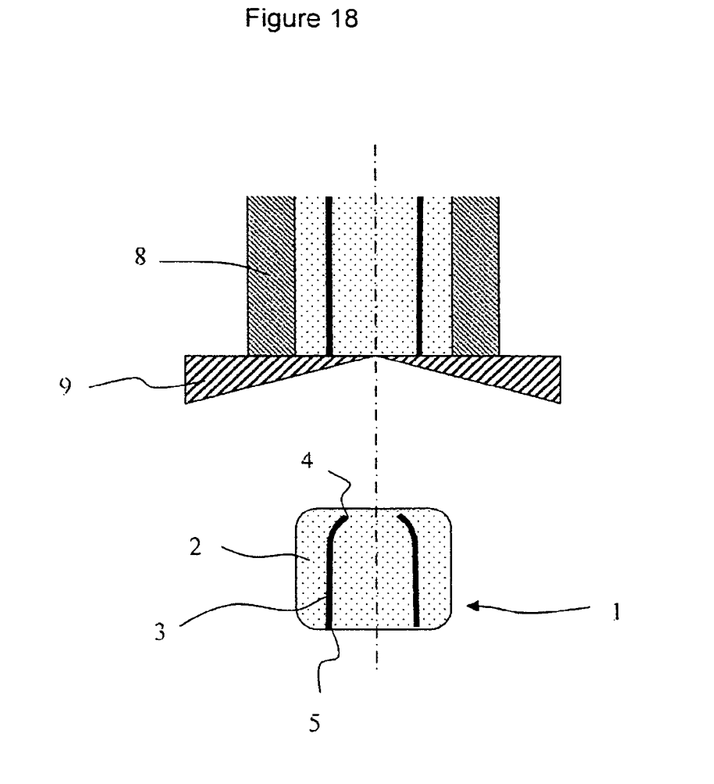
FIG. 18 shows a method for realizing doses corresponding to the second embodiment of the invention.

An example of this second method is illustrated in FIG. 18. A cutter 9 periodically cuts the multilayer flow as it leaves the extrusion die 8, thus forming doses 1. The dose 1 contains a functional layer 3 imprisoned in the resin 2, apart from at the level of the end 5 of said layer 3. The end 4 of said layer 3 is imprisoned in the resin 2, the imprisonment being realized during the cutting of the multilayer rod by the cutter 9. The geometry of the cutter 9, combined with the cutting motion of said cutter, entrains some resin 2, which proceeds to imprison the end 4 of the layer 3.

Figure 19:
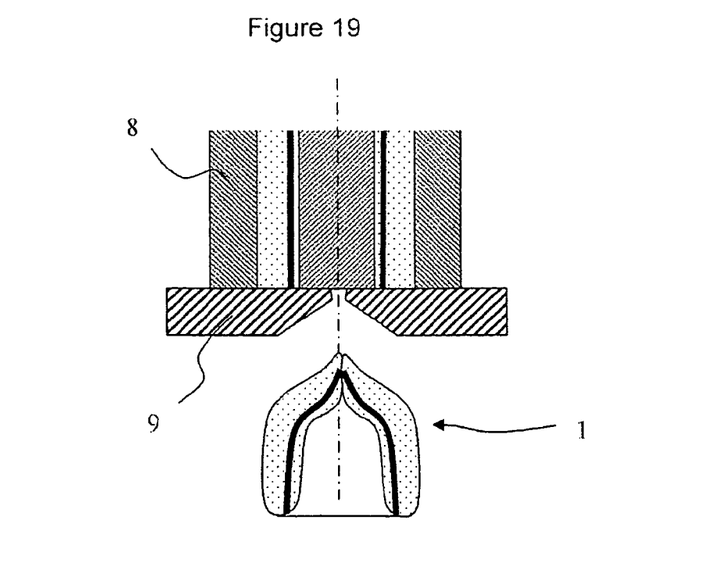
FIG. 19 illustrates another method for realizing doses according to the second embodiment.

Another example of the realization of multilayer doses according to the second method is illustrated in FIG. 19. Doses are formed from a tubular multilayer flow. Upon exit from the extrusion die 8, the cutter 9 periodically cuts the dose 1 and conjointly imprisons the end 4 of the functional layer 3 in the resin 2. Similar methods may be used to imprison one or both ends of the layer 3 in the resin 2. These methods can be applied during the cutting of the dose, during its transfer into the cavity of the mold or inside the molding device. These methods have a common element, which consists in modifying the original geometry of the dose so as to entrain the resin 2 and imprison the end of the layer 3.

In the examples which are presented here, the doses and the objects are of simple geometry, but the invention obviously relates to any geometry of dose and of object.

The objects obtained according to the invention contain a functional layer 3 forming at least one fold at the level of the periphery of the object. Objects also containing a second fold close to the axis of symmetry of the object can be obtained. A zigzag arrangement of the functional layer is obtainable in the object.

Numerous arrangements of the functional layer 3 in the dose are possible. It may be advantageous to dispose the functional layer 3 in the dose such that said functional layer 3 forms the shell of a body of revolution centered on the axis of symmetry. When the distance of the functional layer 3 to the axis of symmetry is variable, advantageous multilayer objects can be obtained.

Doses comprising a plurality of functional layers 3 may equally be used, said functional layers all being centered on the axis of symmetry of said dose. The multilayer objects obtained are characterized in that the functional layers are placed at least partially one on top of the other and each form at least one fold.

Other dose geometries may be used. It has been observed that doses which have a part of their surface concave are particularly advantageous. Such dose geometries facilitate good distribution of the functional layer in the multilayer object.

The invention claimed is:

1. A dose of multilayer synthetic resin for the realization of multilayer objects by compression molding,
   said dose having an axis of symmetry and, before any compression molding, comprising a first synthetic resin and at least one thin functional layer of a different synthetic resin forming the outer shell of a body of revolution defined about said axis of symmetry, said body of revolution comprising two ends disposed in a direction parallel to the axis of symmetry, said functional layer being totally imprisoned in said first synthetic resin, and wherein the ends are at a distance of at least 50 microns from the surface of the dose.

2. The dose as claimed in claim 1, wherein the thin functional layer itself forms a multilayer structure comprising a layer of barrier resin imprisoned between two layers of adhesive resin.

3. The dose as claimed in claim 1, wherein both ends of the functional layer are open.

4. The dose as claimed in claim 1, wherein one of the two ends of the functional layer is open and the other end is closed.

5. The dose as claimed in claim 1, wherein both ends of the functional layer are closed.

6. A multilayer object obtained by compression molding from a dose as claimed in claim 1, said object containing an inner face and an outer face, said inner face defining the inner part of a packaging, said object being formed of said first synthetic resin and said thin functional layer, said functional layer being imprisoned in the wall of said object and forming a fold, said object being wherein the functional layer is totally absent from said inner face.

7. A production method for doses such as defined in claim 1, comprising a step according to which the resins are coextruded so as to form a multilayer flow, said flow being periodically cut so as to form individual portions, said portions being transferred into a compression mold, wherein said portions are deformed in such a way as to cover over the ends of the functional layer with the first synthetic resin.

8. The method as claimed in claim 7, wherein said portions are deformed during the cutting.

9. The method as claimed in claim 7, wherein said portions are deformed during their transfer into the mold.

10. The method as claimed in claim 7, wherein said portions are deformed once they are in the mold.

11. A method for producing doses such as defined in claim 1, comprising a step in which the resins are coextruded in one and the same direction, wherein the method comprises, in succession, a covering step in which solely said first resin is extruded, a coextrusion step, and a further covering step so as to totally imprison said functional layer.

* * * * *